Dec. 8, 1953        R. C. BARKELEW        2,661,925
SEALING MEANS FOR FLUID VALVES
Original Filed Feb. 28, 1948        2 Sheets-Sheet 1
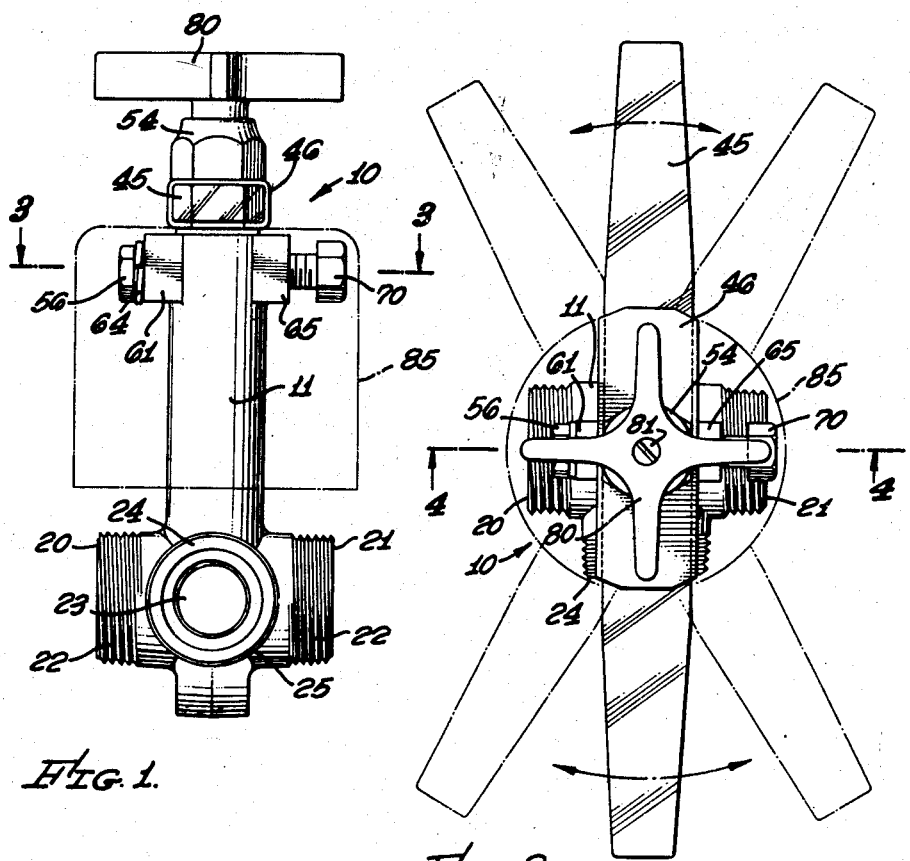
Fig. 1.
Fig. 2.
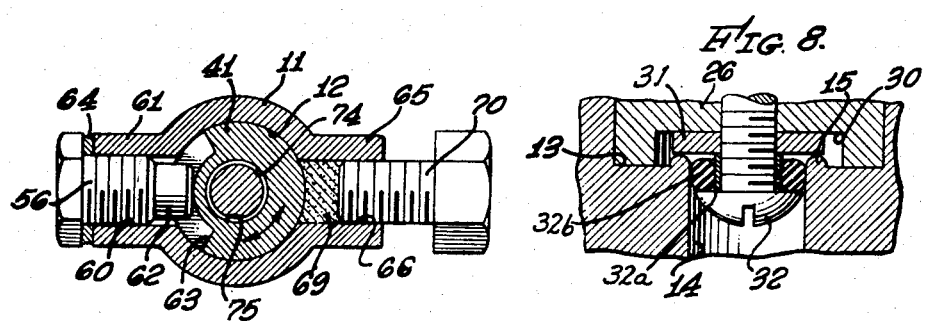
Fig. 3.
Fig. 8.
RICHARD C. BARKELEW
INVENTOR.
BY
ATTORNEY Dec. 8, 1953   R. C. BARKELEW   2,661,925
SEALING MEANS FOR FLUID VALVES
Original Filed Feb. 28, 1948                     2 Sheets-Sheet 2

RICHARD C. BARKELEW
INVENTOR.

BY
ATTORNEY

Patented Dec. 8, 1953

2,661,925

UNITED STATES PATENT OFFICE 2,661,925

SEALING MEANS FOR FLUID VALVES

Richard C. Barkelew, Sierra Madre, Calif.

Original application February 28, 1948, Serial No. 12,003, now Patent No. 2,501,657, dated March 28, 1950. Divided and this application March 24, 1950, Serial No. 151,779

1 Claim. (Cl. 251—27)

The present invention relates to fluid valves, and more particularly to fluid sealing means in fluid valves. The invention is illustratively embodied in a mixing valve having means for regulating the relative proportions of fluids delivered through two inlet supply pipes, and for controlling the total volume of fluid discharged through an outlet pipe. Specifically the present invention has to do with improved fluid sealing means in a mixing valve embodying a valve member which is rotatable with respect to two angularly spaced inlet ports in the housing to control the mixture proportions, and which is movable axially with respect to both the inlet ports and the outlet ports to control the volume of mixed fluids discharged through the latter. The present application is a division of my copending application entitled Fluid Mixture and Volume Control Valve, filed February 28, 1948, Serial No. 12,003, now Patent No. 2,501,657, issued March 28, 1950.

With prior valves in which a valve member carrying a washer rotates as it closes, there is a wear problem as a result of the scouring action of the washer on its seat. This problem is sometimes overcome by using freely rotatable ball bearing washers or the like, but such washers are expensive and a frequent source of trouble.

A primary object of the present invention is the provision of a valve having a simple fluid sealing means which is not subject to the wear problem of the simple washer type, nor as expensive as the ball bearing type.

In the present invention, a valve is provided having accurate straight line travel within the valve chamber, making it possible to employ an O-ring seal in place of the conventional washer. This O-ring seal is adapted to enter the end of an axially disposed outlet port, cooperating with the side walls thereof to close the port. The invention also provides a construction permitting ready substitution of a simple flat rubber sealing washer for the preferred O-ring seal, in the event an O-ring should not be available at the time the valve is serviced.

The foregoing and other objects and advantages of the invention will become apparent to those skilled in the art upon consideration of the following detailed description of the preferred embodiments thereof, reference being had to the accompanying drawings, in which:

Figure 1 is an elevational view of a valve embodying the principles of the invention;

Figure 2 is a top plan view of the same;

Figure 3 is an enlarged sectional view, taken along the line 3—3 in Figure 1;

Figure 8 is an enlarged fragmentary view of a portion of Figure 4, but with the valve in sealing position.

Figure 4:
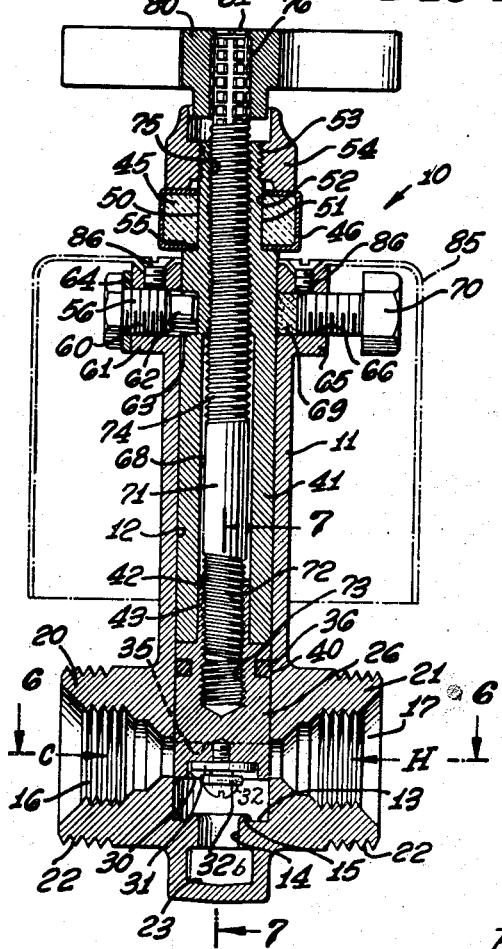
Figure 4 is an enlarged vertical section through the valve, taken along the line 4—4 in Figure 2, and showing the valve in the open condition.

Mixture and control valves of the type with which the present invention is concerned, are adapted for use in any situation requiring changes in the mixture proportions of two incoming fluids without appreciable variation of the total output volume, or changes in the volume without appreciable change in the mixture proportion. The principal use of such valves, however, is in shower installation wherein hot and cold water are mixed in proper proportions to give the desired temperature, and where it is desirable to be able to increase or decrease the total volume of water being discharged, or to turn the water off entirely without disturbing the mixture proportions. Accordingly, the embodiment selected to illustrate the principles of the invention is one designed primarily for shower installations, but it is to be understood that the invention is in no way limited solely to such use, and might be used to equal advantage in many industrial applications.

In the drawings, the valve is designated in its entirety by the reference numeral 10, and is seen to comprise a generally cylindrical body 11, preferably of brass, having a cylindrical chamber 12 formed therein. Inasmuch as the drawings show the valve in a vertical position, the following description will refer to the several parts thereof as the top, bottom, etc., although it will be understood that such orientation relates solely to the illustrative drawings. The top end of the chamber 12 is open, while the bottom end thereof is designated at 13, and is formed with a central, axially extending outlet port 14 having a raised annular seat 15 around its margin.

Intersecting the chamber 12 at a short distance above the bottom 13 are two diametrically opposed inlet ports 16 and 17 which open into oppositely extending coupling bosses 20 and 21, respectively. The bosses 20 and 21 are externally threaded at 22 to receive coupling members (not shown) which connect the cold water and hot water supply pipes to the valve. The outlet port 14 opens at its bottom end into a passageway 23 which curves upwardly and forwardly therefrom and opens into a forwardly extending coupling boss 24 that is threaded at 25 to receive a coupling member for connecting the valve to a discharge pipe.

Slidably disposed within the bottom portion of the chamber 12 and also rotatable therein, is a cylindrical valve member 26 which is preferably, although not necessarily, formed of stainless steel. A shallow circular recess 30 is machined in the bottom end of the member 26, and seated within this recess is a rubber washer 31 which is secured by a screw 32, this washer being somewhat thinner than the depth of the recess 30. Surrounding the screw 32 near its head is a thin-walled spacer sleeve 32a, and disposed within the annular space between the screw head and the washer is an O-ring 32b. The O-ring is very slightly larger in outside diameter than the diameter of the outlet port 14, and is therefore squeezed slightly when pushed down into the same forming a water tight seal. The sleeve 32a in engagement with the rubber washer 31 seals against leakage of water inside the O-ring along the threads of the screw. Finally, the washer 31 may engage the seat 15 at the end of the stroke of the valve to effect a further seal at that point, which further seal is a safeguard against leakage in the event the O-ring should ultimately fail. It should be evident that the successful use of the O-ring is made possible by the accurate straight line movement of the valve member in the valve chamber. In other words, the construction avoids "wobble" of the valve member, such as would cause the O-ring to press more tightly against one side of the outlet passage 14 than the other, and so encourage leakage.

Figure 6:
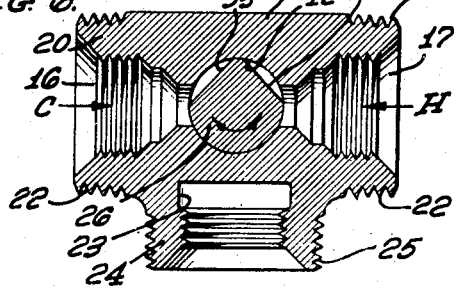
Figure 6 is a sectional view taken along the line 6—6 in Figure 4.

Formed in the sides of the valve member 26 at the bottom end thereof are passage means which cooperate with the inlet ports 16, 17 to control the flow of fluid entering the chamber 12. These passage means are illustratively shown as comprising two angularly spaced flats 33 and 34 which are milled into the cylindrical surface of the valve member 26; although the invention is not in any way limited to flats, but also contemplates the use of curved surfaces or channels that are developed to give more accurate control. The flats 33, 34 are spaced slightly more than 90° apart so that when the member 26 is turned counterclockwise, or to the left (Figure 6) as far as it will go, inlet port 16 is completely uncovered by flat 33, while port 17 is completely closed off by the valve member. Similarly, when the valve member 26 is turned to the right as far as it will go, port 17 is completely uncovered by flat 34, while port 16 is completely closed off by valve member. When the valve member is positioned so that the flats 33, 34, uncover ports 16 and 17 equally, as shown in Figure 6, the volume of flow from each side is equal.

At the top edge of each of the flats 33, 34 is a shoulder 35 which is adapted to cut off the inlet ports 16, 17, when the valve member 26 is moved downwardly to the bottom of the chamber 12. The shoulders 35 close the ports 16, 17 just before the washer 31 closes against the seat 15, and the inlet ports are thus closed off from one another when the valve is closed, so that bypass of water from one inlet to the other is positively prevented.

The upper portion of the cylindrical valve member 26 has an annular groove 36 formed therein, and seated within this groove is an O-ring 40 of rubber or like material, which seals the clearance between the valve member and the wall of the chamber 12 against leakage of water into the upper portion of the chamber.

Rotation of the valve member 26 within the chamber 12 to regulate the mixture proportions of the fluid flow is effected by means of a tubular member 41 which is rotatably disposed within the top portion of the chamber. The bottom end of the tube 41 has two diametrically opposed, axially extending slots 42 formed therein which receive a companionate tongue 43 projecting upwardly from the top end of the valve member 26, and this tongue and slot connection between them causes the valve member to be rotated with the tube 41. At the same time, the valve member is permitted to move axially with respect to the tube 41 to the extent of the length of engagement of the tongues 43 within the slots 42.

The tube 41 projects above the top end of the valve body 11, and fixedly secured to the projecting end thereof is a mixture control handle 45. The handle 45 is preferably, although not necessarily, in the form of a transversely extending, elongated bar, which may be made of plastic or other suitable material, with a sheet metal sleeve 46 surrounding its midportion. Flats 50 and 51 are milled into opposite sides of the projecting end of the tube 41, and the handle bar 45 and sleeve 46 have correspondingly shaped holes 52 formed therein which receive the flat-sided portion of the tube, providing a non-rotatable connection between the handle and the tube. The top end portion of the tube projecting above the handle bar 45 is threaded at 53, and a nut 54 is screwed onto the threads to clamp the handle bar down tightly against shoulder 55 at the bottom edge of the flats 50, 51.

The tube 41 is held against axial movement within the chamber 12 and is also limited to an angular travel of slightly more than 90°, by means of a limit stop bolt 56 which is screwed into a threaded hole 60 formed in a boss 61 projecting laterally from one side of the valve body 11 at the top end thereof. The threads are relieved from the inner end of the bolt 56, forming a smooth-sided nose 62 which extends into a circumferentially extending slot 63 in the side of the tube 41. The length of the slot 63 is such that its ends are engaged by the nose 62 when the tube and valve member 26 are turned to either extreme position of the latter. A lock washer 64 prevents the bolt 56 from working loose.

On the opposite side of the valve body 11 from boss 61 is another laterally projecting boss 65 having a threaded hole 66 provided therein which receives a screw 70. The inner end of the screw 70 bears against a plug of fibrous material 69, pressing the same against the surface of the tube 41. The plug of material 69 functions as a friction brake for the tube 41 and restrains the latter against turning when the volume control handle is turned. The degree of frictional restraint can be increased or decreased by tightening or loosening the screw 70.

Axial movement of the valve member 26 to regulate the volume of flow is obtained by means of a turnbuckle-like arrangement consisting of a stem 71 which extends down through the central opening 68 of the tubular member 41. The bottom end of the stem 71 has a left hand thread 72 formed thereon, and this threaded portion is received within a threaded hole 73 in the valve member 26. The upper portion of the stem 71 has a right hand thread 74 formed thereon, which is engaged by internal threads 75 formed in the upper end of the hole 68.

The stem 71 projects beyond the top end of the tube 41, and its upper end is serrated, or splined at 76 to receive a volume control handle 80. The volume control handle 80 is coaxial with the mixture control handle 45 and is spaced outwardly therefrom. A screw 81 which is threaded into a tapped hole in the top end of the stem 71 holds the handle 80 on the stem.

In the usual installation, the bottom portion of the valve body 11 is located within the bathroom wall, with the top portion projecting through a hole in the wall. Both the valve body 11 and the hole in the wall are preferably concealed by an ornamental, cup-shaped bonnet 85 which is secured to the valve body by a pair of countersink screws 86 threaded into tapped holes in the top surface of the bosses 61 and 65.

The operation of my valve is believed to be self-evident from the foregoing description. The mixture proportions of the incoming hot and cold water (designated by the arrows H and C) is regulated by turning the mixture control handle 45 to one side or the other from the straight up and down position shown in solid lines in Figure 2. When the handle is turned to the left as far as it will go, the cold water port 16 is completely uncovered by the flat 33, while the hot water port 17 is entirely closed off. When the handle 45 is turned to the right as far as it will go, the hot water port 17 is uncovered by the flat 34, and the cold water port 16 is closed off. In the intermediate position, the two ports are equally exposed, and one-half the total volume of water passing through the valve enters through the cold water port 16, while the other half enters through the hot water port 17. With the mixture control handle 45 positioned at any desired setting, the volume of flow is regulated by turning the volume control handle 80. When the handle 80 is turned to the right, or clockwise, the right hand threads 74 cause the stem 71 to move downwardly with respect to the tubular member 41, while the left hand threads 72 cause the valve member 26 to move downwardly with respect to the stem 71. Thus, the travel of the valve member 26 is equal to the sum of the movements imparted to it by the right hand threads 74 and the left hand threads 72. The advantage of this arrangement is that the valve member 26 is advanced twice as fast as it would be if there were only one set of threads of the same pitch. Since the upper part of the valve chamber 12 is sealed off from the bottom portion thereof by the O-ring seal 40, the threads 72 and 74 can be packed with grease for permanent lubrication.

The advantage of the O-ring over the conventional flat washer is that the former seals with effortless ease, whereas the flat washer must be clamped tightly against its seat. Furthermore, if the washer is not closed absolutely water-tight, the leakage of water over the metallic seat causes erosion of the latter, which can be corrected only by grinding or refacing the seat. The O-ring forms a positive, absolutely leak-proof seal, and is therefore not subject to erosion. The present invention is particularly adapted to the use of O-ring seals, because of the fact that the valve member 26 moves in a straight-line path, without any rotation, and because the valve member is accurately guided within the chamber 12.

Figure 5:
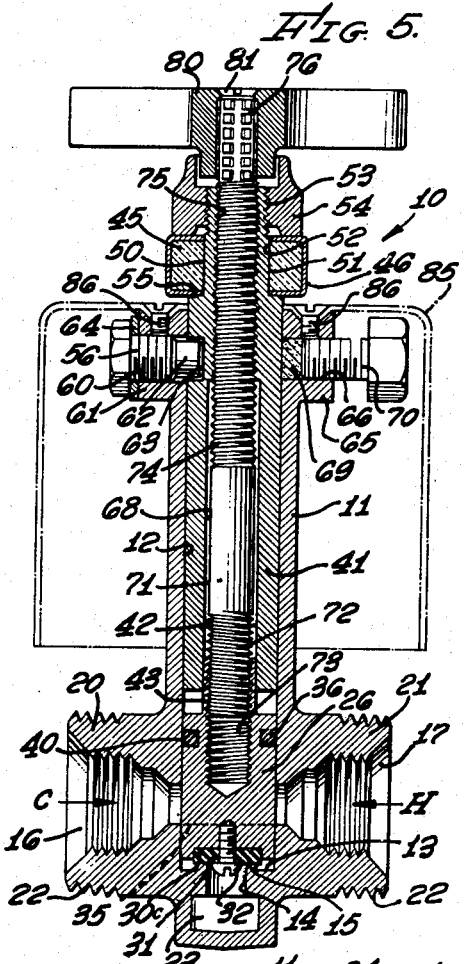
Figure 5 is a view similar to Figure 4, showing the valve in the closed condition, and showing also the substitution of a different type of sealing washer.
Figure 7:
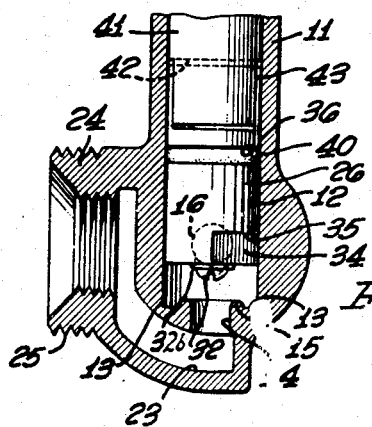
Figure 7 is a sectional view taken along the line 7—7 in Figure 4.

An important feature of the instant invention, however, is that the valve and outlet passage are so formed as to permit the substitution of an ordinary type of flat rubber washer for the O-ring assembly in the event that O-rings should not be available, for example, when the valve is serviced. Thus Figure 5 shows how a somewhat larger and thicker rubber washer 30c can be substituted for washer 30, with the O-ring and spacer sleeve eliminated. The washer 30c engages against the seat 15 to effect the seal. Because of the straight line travel of the valve member in moving the valve against its seat, without any rotational movement, the washer closes with its seat without rubbing or scouring against the seat, and hence is free from the excessive wear that such washers usually experience.

While I have shown and described in considerable detail what I believe to be the preferred form of my invention, it is to be understood that such details are merely illustrative, and that various changes may be made in the shape and arrangement of the several parts thereof without departing from the scope of the invention, as defined in the appended claim.

I claim:

A fluid valve comprising a body having a cylindrical chamber formed therein, a liquid port opening into the side of said chamber, a cylindrical liquid port opening into one end of said chamber axially of said chamber, said cylindrical liquid port being of lesser diameter than said chamber, to afford an annular shoulder at its juncture with said chamber, a raised valve seat on said shoulder around said cylindrical liquid port, a cylindrical valve disposed within said chamber constrained to move axially and non-rotatably therein, a recess of greater diameter than said seat sunk in the end of said valve member coaxially with said valve member, in such manner that said valve member can bottom on said shoulder with said raised seat received in said recess, a washer received in said recess, said washer overlying said raised seat, and being of lesser thickness than the depth of said recess, but of sufficient thickness to engage said raised seat when said valve is bottomed on said shoulder, an axially disposed screw carried by and projecting from the recessed end of said valve, a spacer sleeve around said screw between the head of the screw and said washer, and an O-ring around said spacer sleeve between said screw head and said washer, said O-ring being adapted to seatingly engage the cylindrical wall surfaces of said cylindrical port when said valve is moved to advance said screw and O-ring into said cylindrical port.

RICHARD C. BARKELEW.

References Cited in the file of this patent

UNITED STATES PATENTS

| Number | Name | Date |
|---|---|---|
| 1,510,528 | Sebenste | Oct. 7, 1924 |
| 1,537,948 | Katzin | Mar. 19, 1925 |
| 1,667,580 | Albrecht | Apr. 24, 1928 |
| 2,124,155 | Thaete | July 19, 1938 |
| 2,277,251 | Palmer | Mar. 24, 1942 |
| 2,360,733 | Smith | Oct. 17, 1944 |

FOREIGN PATENTS

| Number | Country | Date |
|---|---|---|
| 309 | Great Britain | of 1914 |
| 9,164 | Great Britain | of 1915 |
| 40,549 | Germany | of 1887 |
| 486,318 | Germany | of 1929 |